United States Patent
Sato et al.

(10) Patent No.: US 12,289,527 B2
(45) Date of Patent: Apr. 29, 2025

(54) IMAGE CAPTURING APPARATUS, CONTROLLING METHOD, AND MEDIUM

(71) Applicant: CANON KABUSHIKI KAISHA, Tokyo (JP)

(72) Inventors: Natsuko Sato, Kanagawa (JP); Ryo Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 260 days.

(21) Appl. No.: 18/180,966

(22) Filed: Mar. 9, 2023

(65) Prior Publication Data

US 2023/0292010 A1  Sep. 14, 2023

(30) Foreign Application Priority Data

Mar. 14, 2022 (JP) .................................. 2022-039559
Nov. 18, 2022 (JP) .................................. 2022-184973

(51) Int. Cl.
*H04N 23/695* (2023.01)
*G06T 7/13* (2017.01)
(Continued)

(52) U.S. Cl.
CPC ............. *H04N 23/695* (2023.01); *G06T 7/13* (2017.01); *G06T 7/50* (2017.01); *H04N 23/62* (2023.01)

(58) Field of Classification Search
CPC ........ H04N 23/695; H04N 23/62; G06T 7/50; G06T 7/13
See application file for complete search history.

(56) References Cited

U.S. PATENT DOCUMENTS

| 6,567,126 B1 * | 5/2003 | Slatter .................... | H04N 1/195 348/E5.078 |
| 7,064,789 B1 * | 6/2006 | Shono .................... | H04N 23/51 348/E5.026 |

(Continued)

FOREIGN PATENT DOCUMENTS

| JP | 2003-185902 A | 7/2003 |
| JP | 2011-059283 A | 3/2011 |
| JP | 2013-156600 A | 8/2013 |

OTHER PUBLICATIONS

Aug. 21, 2023 European Patent Office Search Report, which is enclosed, that issued in European Patent Application No. 23160729.2.

(Continued)

*Primary Examiner* — Lin Ye
*Assistant Examiner* — Steven Daniel Barry
(74) *Attorney, Agent, or Firm* — Cowan, Liebowitz & Latman, P.C.

(57) ABSTRACT

An image capturing apparatus comprises: an image capturing unit including an imaging optical system and an image sensor; a rotation driving unit configured to drive the image capturing unit in a pan direction and/or tilt direction; a shift driving unit configured to drive at least one of the imaging optical system and the image sensor within a plane parallel to an imaging plane; and a synchronous control unit configured to synchronize a rotation driving of the image capturing unit and a shift driving of at least one of the imaging optical system and the image sensor so as not to change an imaging range of the image capturing unit during performing a correction on distortion of an object in a captured image captured by the image capturing unit.

20 Claims, 16 Drawing Sheets

(51) Int. Cl.
*G06T 7/50* (2017.01)
*H04N 23/62* (2023.01)

(56) References Cited

U.S. PATENT DOCUMENTS

| | | |
|---|---|---|
| 2002/0118292 A1 | 8/2002 | Baron |
| 2016/0134801 A1* | 5/2016 | Ashitani ................ H04N 23/58 348/211.3 |
| 2019/0104239 A1* | 4/2019 | Aschwanden ........... G02B 3/14 |

OTHER PUBLICATIONS

Jul. 29, 2024 Japanese Office Action, which is enclosed without an English Translation, that issued in Japanese Patent Application No. 2022-184973.

* cited by examiner

F I G. 17

| DISTORTION SHAPE | CAMERA UNIT ROTATION CONTROL | IMAGE SENSOR SHIFT CONTROL |
|---|---|---|
| UPPER DISTORTION | TILT DOWN DIRECTION | DOWN DIRECTION |
| LOWER DISTORTION | TILT UPWARD DIRECTION | UPWARD DIRECTION |
| RIGHT DISTORTION | PAN RIGHT DIRECTION | RIGHT DIRECTION |
| LEFT DISTORTION | PAN LEFT DIRECTION | LEFT DIRECTION |

IMAGE CAPTURING APPARATUS, CONTROLLING METHOD, AND MEDIUM

BACKGROUND OF THE INVENTION

Field of the Invention

The present invention relates to image capturing control for reducing object distortion.

Description of the Related Art

When an object does not directly face a camera in, for example, shooting a tall building from the ground, the object in the captured image is distorted. As a technique for solving this, there is known a technique (to be referred to as "shift control" hereinafter) of causing a camera and an object to directly face each other, translationally moving (shifting) the image sensor (or optical system) with respect to the imaging plane, and then shooting the object.

Japanese Patent Laid-Open No. 2003-185902 (patent literature 1) discloses a technique of detecting the tilt of an object with respect to a camera using distance measurement data obtained based on image capturing, and performing correction for direct-facing. Patent literature 1 also discloses a technique of performing correction for direct-facing by rotation control of a lens unit and shift control of an image sensor. Japanese Patent Laid-Open No. 2011-059283 (patent literature 2) discloses a technique of detecting the distortion (angle) of the edge of an object in the vertical direction and performing shift control of an optical system to compensate for the detected distortion.

However, in patent literature 1, the tilt of an object is detected based on the difference between a plurality of distance measurement data obtained at different image height positions in an image sensor. When the distance measurement precision is low, the distortion of the object may not be properly corrected. In patent literature 2, shift control of the optical system is performed to compensate for the distortion of an edge, but fluctuations of the imaging range by shift control are not considered. The position of the object in the captured image may change during shift control, degrading the quality.

SUMMARY OF THE INVENTION

According to one aspect of the present invention, an image capturing apparatus is provided. The image capturing apparatus comprises: an image capturing unit including an imaging optical system and an image sensor; a rotation driving unit configured to drive the image capturing unit in a pan direction and/or tilt direction; a shift driving unit configured to drive at least one of the imaging optical system and the image sensor within a plane parallel to an imaging plane; a processor; and a memory containing instructions that, when executed by the processor, cause the processor to function as: a synchronous control unit configured to synchronize a rotation driving of the image capturing unit and a shift driving of at least one of the imaging optical system and the image sensor so as not to change an imaging range of the image capturing unit during performing a correction on distortion of an object in a captured image captured by the image capturing unit.

The present invention performs more appropriate distortion correction while improving the quality of a captured image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a table showing the relationship between rotation control and shift control for each distortion shape;

DESCRIPTION OF THE EMBODIMENTS

Figure 1:
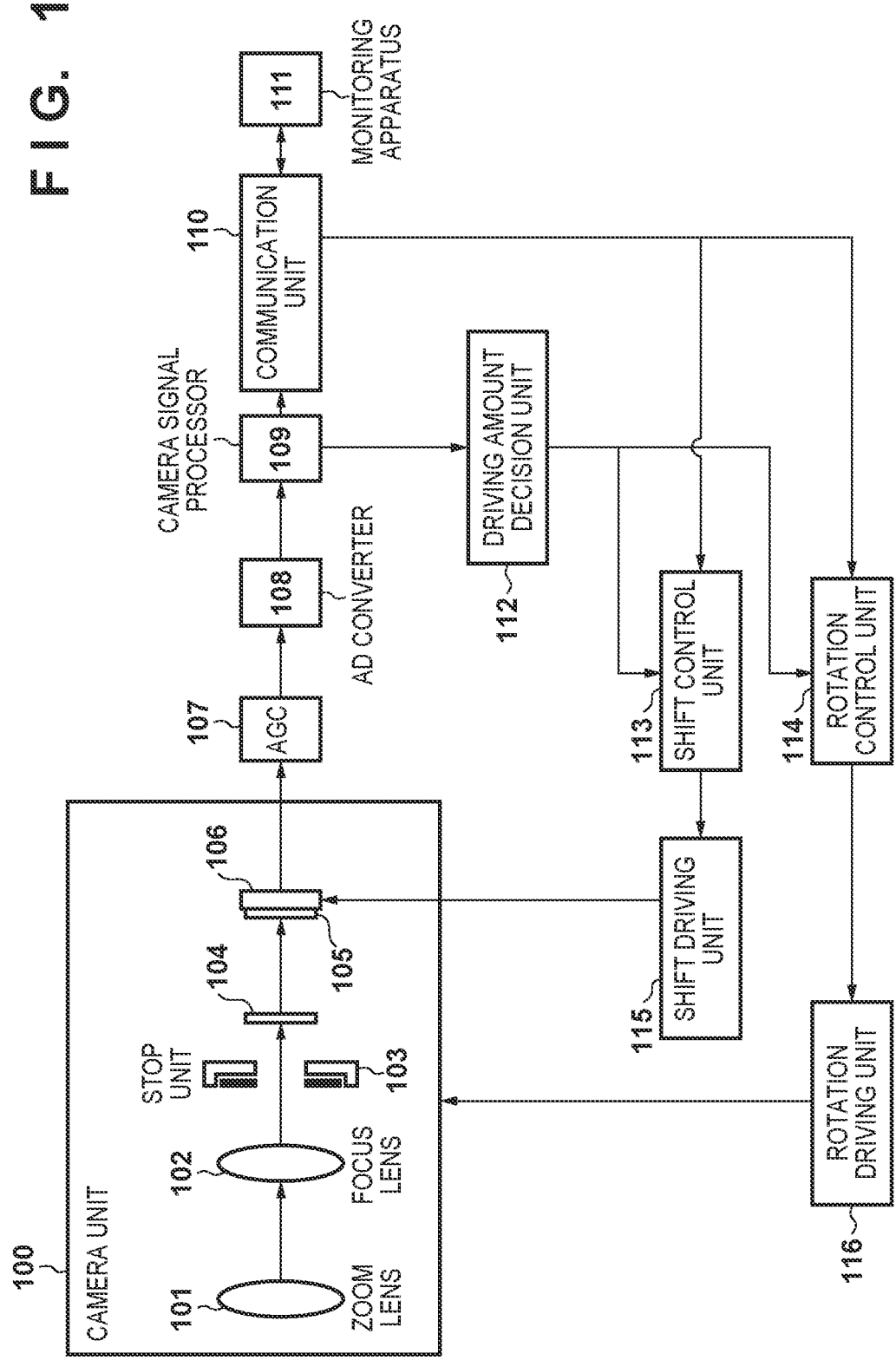
FIG. 1 is a block diagram for explaining the arrangement of an image capturing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image capturing system will be exemplified below as an image capturing apparatus according to the first embodiment of the present invention.

<System Arrangement>

FIG. 1 is a block diagram for explaining the arrangement of the image capturing system. The image capturing system includes an image capturing apparatus and a monitoring apparatus 111. The image capturing apparatus includes a camera unit 100 serving as an image capturing unit, an Auto Gain Controller (AGC) 107, an Analog-to-Digital (A/D) converter 108, a camera signal processor 109, and a communication unit 110. The image capturing apparatus further includes a driving amount decision unit 112, a shift control unit 113, a rotation control unit 114, a shift driving unit 115, and a rotation driving unit 116.

The camera unit 100 includes an imaging optical system, a BandPass Filter (BPF) 104, a color filter 105, and an image sensor 106. The imaging optical system includes a zoom lens 101 that moves along the optical axis to change the focal length, a focus lens 102 that moves along the optical axis to adjust the focus, and a stop unit 103 that adjusts the light quantity. Note that the imaging optical system may be integral with the image capturing apparatus or detachable from it.

Light having passed through the imaging optical system forms an object image as an optical image on the image sensor 106 via the BPF 104 and the color filter 105. The BPF 104 may be removable from the optical path of the imaging optical system. The object image is photoelectrically converted by the image sensor 106.

An analog electric signal (image capturing signal) output from the image sensor 106 is gain-adjusted by the AGC 107 and converted into a digital signal by the A/D converter 108. The digital signal is input to the camera signal processor 109. The camera signal processor 109 performs various image processes on the digital image capturing signal, generating a video signal.

The video signal is output to the monitoring apparatus 111 connected by wired or wireless communication to the image capturing apparatus via the communication unit 110. The monitoring apparatus 111 receives an instruction from the user, and outputs control signals such as a command to the shift control unit 113 and the rotation control unit 114 via the communication unit 110.

Based on either of a rotation driving amount when performing rotation control of the camera unit 100 and a shift driving amount when performing shift control of the image sensor 106, the driving amount decision unit 112 decides the other driving amount. The rotation control is posture control on rotation movement in the pan direction and/or tilt direction. At this time, a decided driving amount is the other driving amount for performing a correction operation to compensate for a change of the imaging range generated by one control (rotation control or shift control). That is, the other driving amount is decided to suppress a change of the position of the object in the captured image. Details of decision of the driving amount in the driving amount decision unit 112 will be described later with reference to FIGS. 2 to 5.

The shift control unit 113 instructs the image sensor 106 about shift driving based on the driving instruction (shift driving amount) decided by the driving amount decision unit 112 or accepted via the communication unit 110. The rotation control unit 114 instructs the camera unit 100 about rotation driving based on the rotation driving amount decided by the driving amount decision unit 112 or designated via the communication unit 110.

The shift driving unit 115 drives the image sensor 106 based on the shift driving designated from the shift control unit 113. The shift driving unit 115 is, for example, a motor.

The rotation driving unit 116 drives the camera unit 100 based on the rotation driving designated from the rotation control unit 114. The rotation driving unit 116 is, for example, a motor. The shift control unit 113 and the shift driving unit 115 perform designation of shift driving and driving to the image sensor 106, but may perform designation of shift driving and driving to the optical system.

<Shift Control for Compensating (correction) for Object Distortion>

Figure 2:
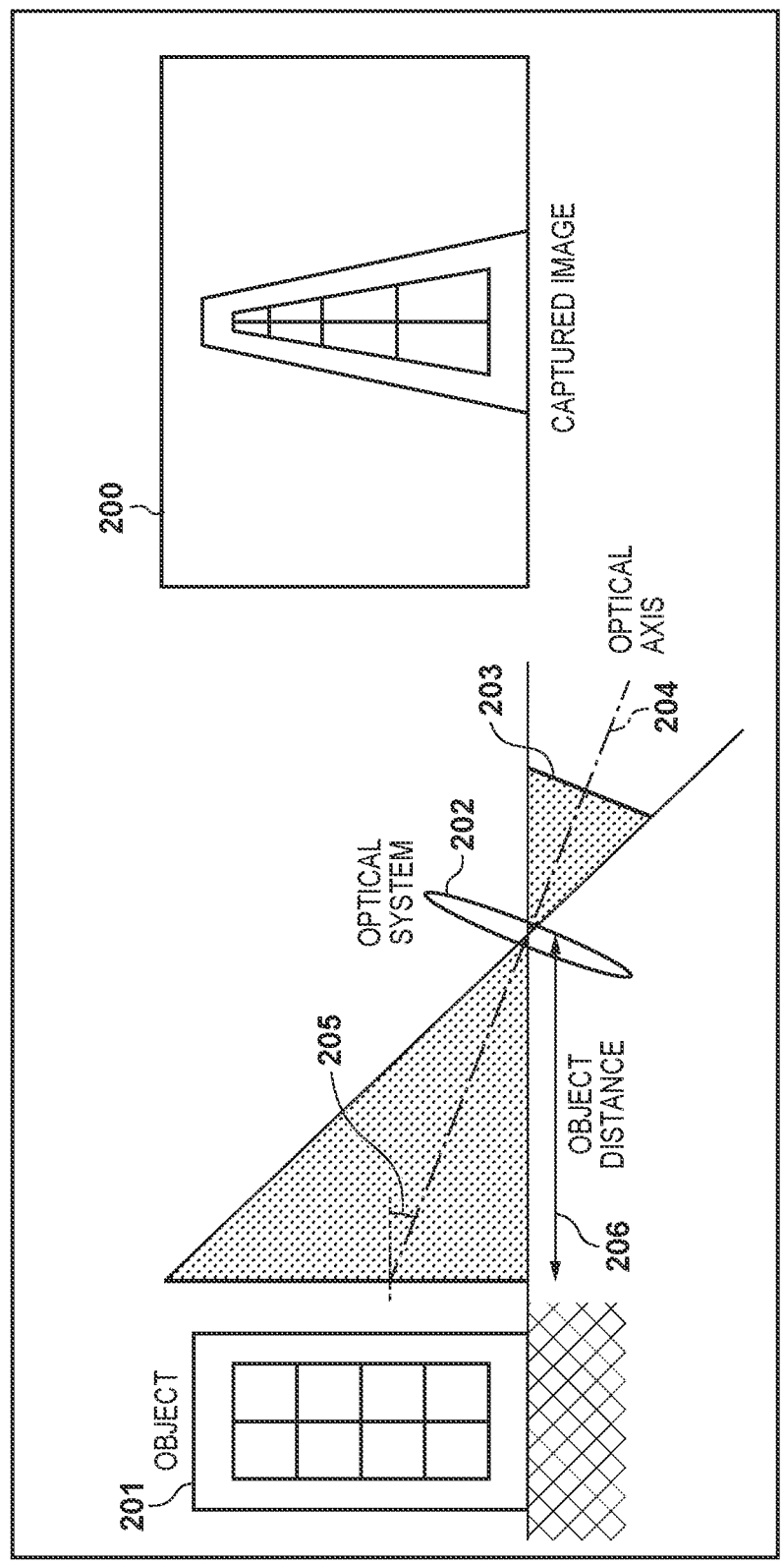
FIG. 2 is a view for explaining an object distortion.

FIG. 2 is a view for explaining an object distortion. FIG. 2 is a schematic view for when the photographer looks up at a building from the ground and shoots it, and illustrates an image captured at that time. When the camera unit does not directly face an object 201 (that is, the object 201 (wall of the building) and an optical axis 204 are not perpendicular), the building is distorted like a trapezoid (object distortion), as illustrated in a captured image 200.

Figure 3:
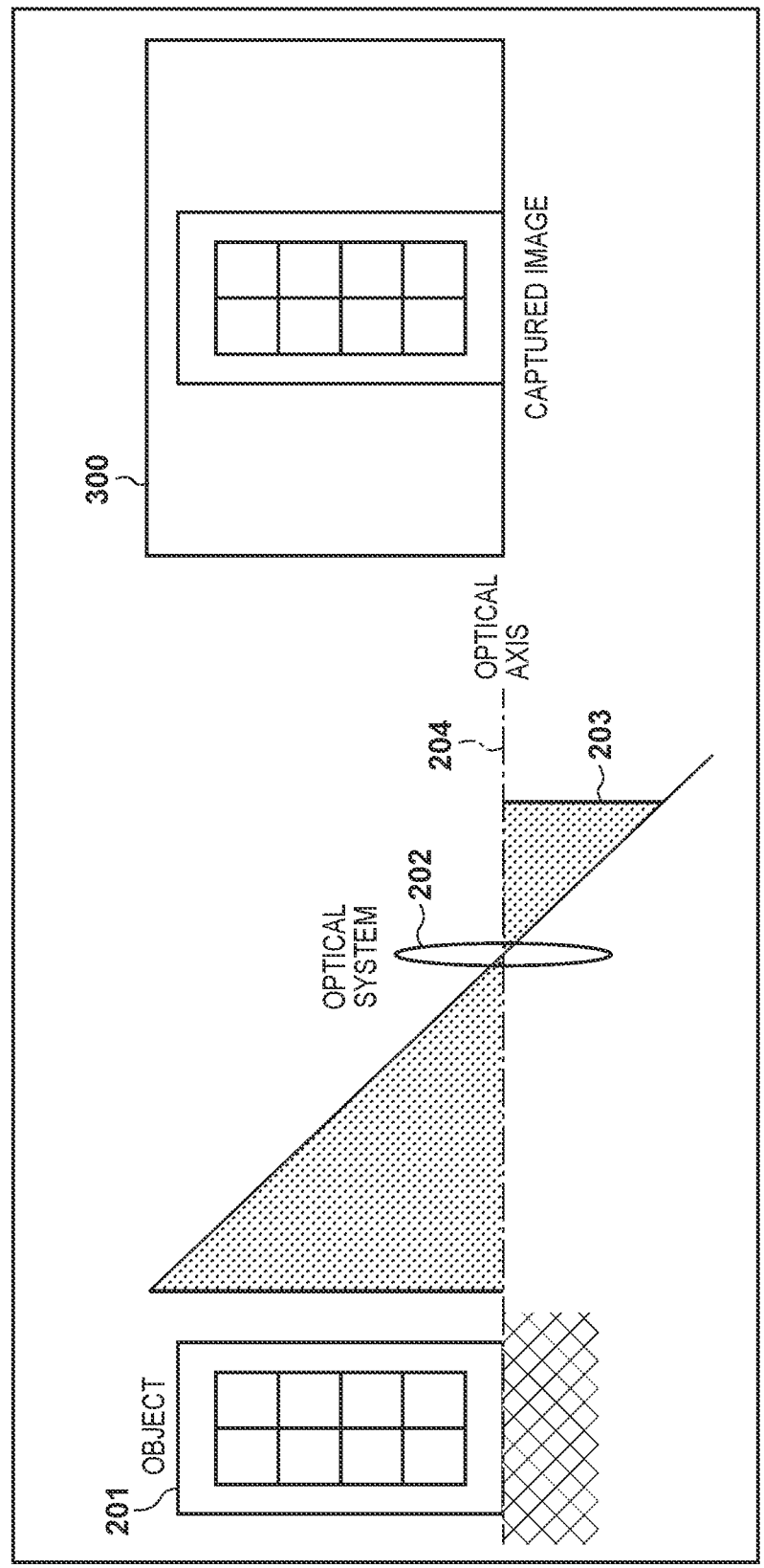
FIG. 3 is a view for explaining shift control.

FIG. 3 is a view for explaining shift control. FIG. 3 is a schematic view when the image capturing apparatus directly faces the same object 201 (building) as that in FIG. 2 and shoots it by shift control, and illustrates an image captured at that time. More specifically, an imaging plane 203 is shifted down (relatively to an optical system 202) so that the optical axis 204 becomes perpendicular to the object 201 (wall of the building) and the object 201 falls within the imaging range. By this shift control, the object distortion is compensated (corrected) for as represented by a captured image 300.

To achieve image capturing in which an object distortion is compensated (corrected) for like the captured image 300, the camera unit 100 and the image sensor 106 need to be controlled appropriately. This requires information about an elevation angle 205 and an object distance 206.

Figure 4:
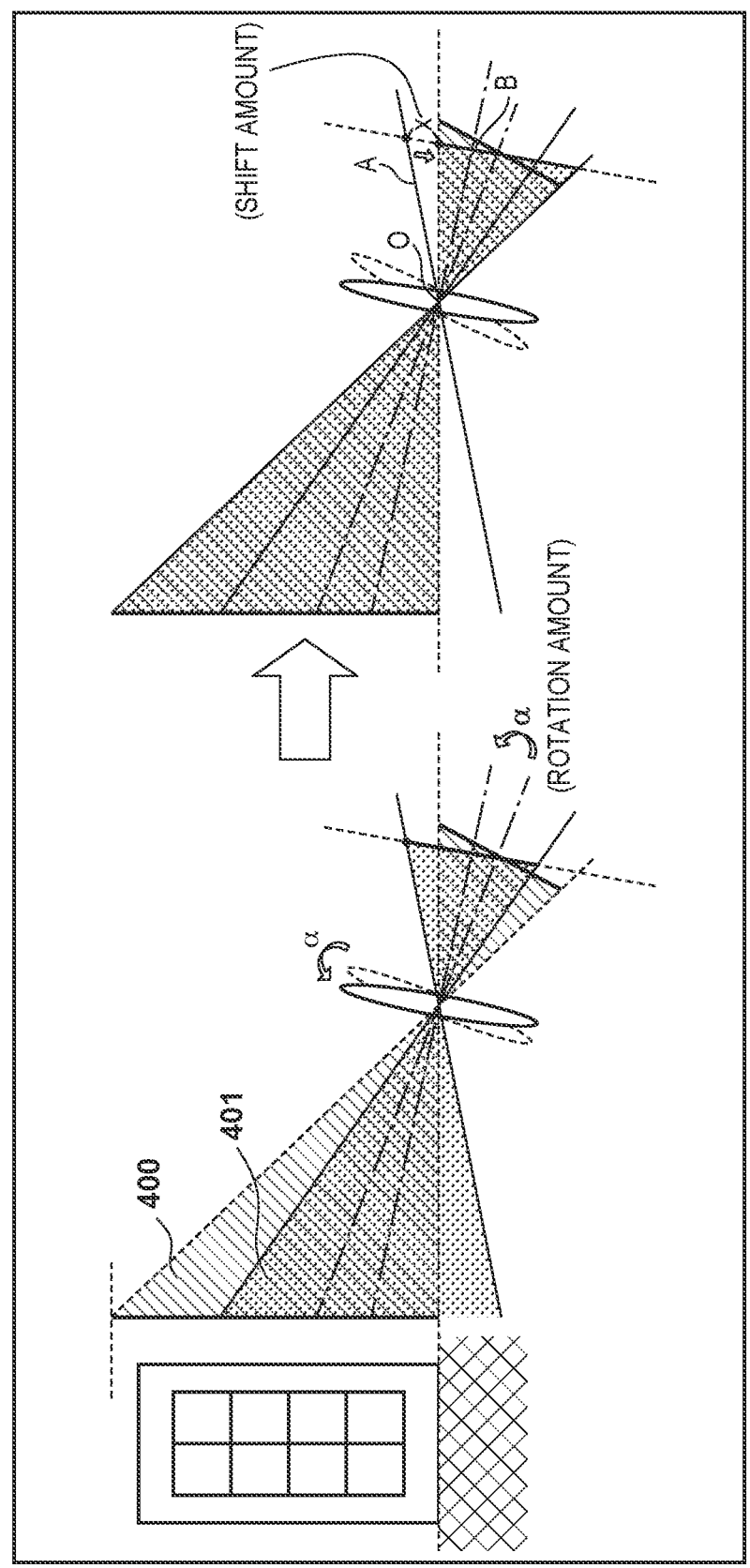
FIG. 4 is a view for explaining control for reducing an object distortion while maintaining the imaging range.

FIG. 4 is a view for explaining control for reducing an object distortion while maintaining the imaging range. More specifically, FIG. 4 shows a state in which shift control (shift amount x) for maintaining the imaging range is performed while performing rotation control (rotation amount α) of the camera unit to bring the optical axis 204 close to be perpendicular to the object 201 (wall of the building) from the shooting state in FIG. 2.

That is, when the camera unit 100 is controlled to rotate (tilt) by only the small rotation amount α, the imaging range changes from an original imaging range 400 to an imaging range 401 by α rotation of the camera unit. For example, in a captured image within the imaging range 401, the ground is captured in ⅓ of the image from the bottom and the top of the building is lost (not captured). To suppress such a change of the imaging range (maintain the imaging range 400), the image sensor 106 is shifted down by the shift amount x within the imaging plane.

Figure 5:
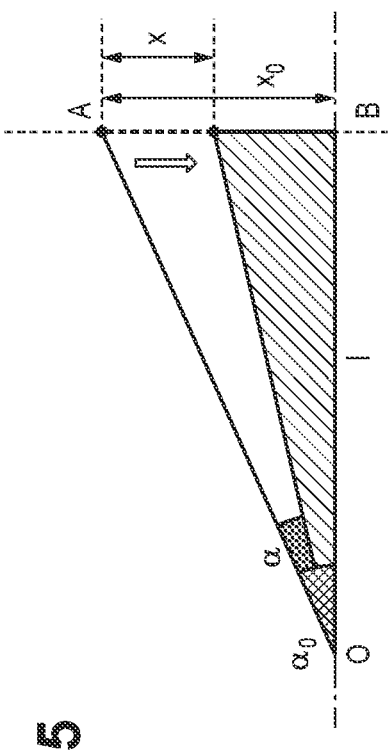
FIG. 5 is a view for explaining calculation of the driving amounts of rotation control and shift control.

FIG. 5 is a view for explaining calculation of the driving amounts of rotation control and shift control. More specifically, a method of calculating the shift amount x of the image sensor 106 in accordance with the rotation amount of the camera unit 100 to maintain the imaging range as shown in FIG. 4 will be explained.

A triangle OAB shown in FIG. 5 is an enlarged view of a triangle OAB shown in FIG. 4, where a is the rotation amount of the camera unit 100, ω is the vertical angle of view/2, x is the shift amount of the image sensor 106, $x_0$ is the vertical sensor size/2, and 1 is the imaging position. At this time, the shift amount x of the image sensor when the camera unit 100 is rotated by α is given by equation (1):

$$x = x_0 - l * \tan(\alpha_0 - \alpha) \quad (1)$$

$$x = x_0 - l * \tan(\alpha_0 - \alpha) = x_0 - l * \frac{\tan\alpha_0 - \tan\alpha}{1 + \tan\alpha_0 \tan\alpha}$$

In this case, equation (2) is established:

$$\tan\alpha_0 = \frac{x_0}{l} \quad (2)$$

From equations (1) and (2), when the camera unit 100 is rotated by α, the shift amount x of the image sensor for suppressing a change of the imaging range can be given by equation (3) using the vertical sensor size and the imaging position:

$$x = x_0 - l * \frac{\frac{x_0}{l} - \tan\alpha}{1 + \frac{x_0}{l}\tan\alpha} \quad (3)$$

That is, an object distortion can be reduced by performing rotation control and shift control using the relation of equation (3). In addition, a change of the imaging range during correction control (rotation control and shift control) can be suppressed (that is, the imaging range can be maintained).

Figure 6:
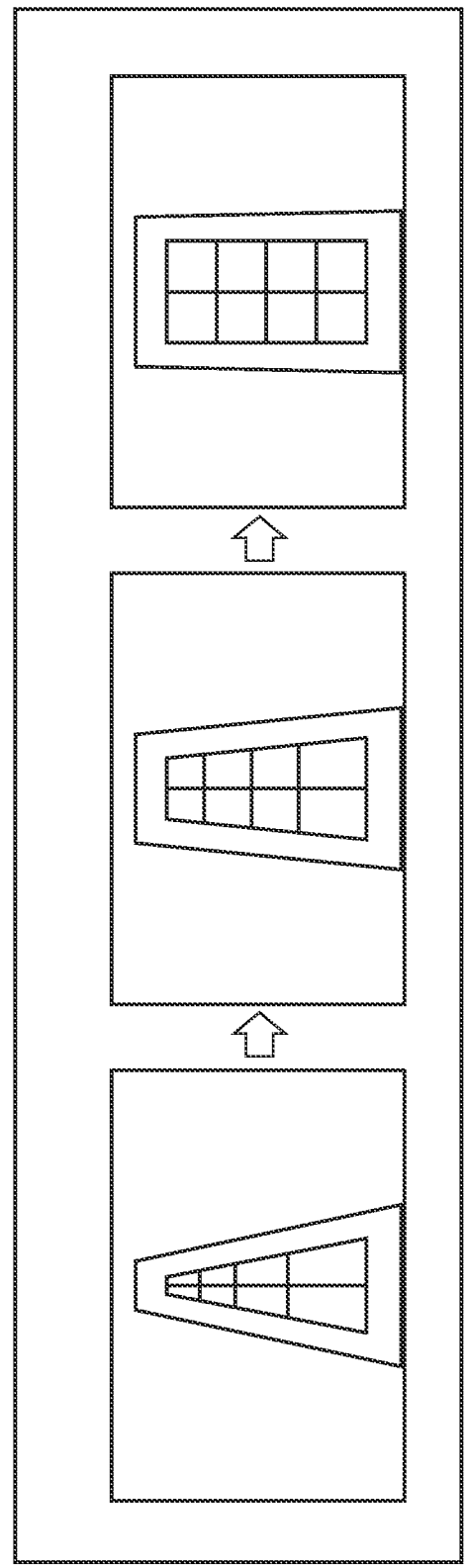
FIG. 6 is a view showing a temporal change of a captured image in distortion correction.

FIG. 6 is a view showing a temporal change of the captured image in distortion correction. FIG. 6 shows, for example, a change of the captured image displayed on the display unit of the monitoring apparatus 111 from the start to completion of correction control (rotation control and shift control).

At the start of image capturing (before the start of correction control), a distortion is generated in which the upper portion of the building serving as an object becomes shorter than the lower portion (to be referred to as "upper distortion" hereinafter). In this state, shift control of the image sensor 106 synchronized with rotation control of the camera unit 100 is started using the relation of equation (3). Then, the distortion generated in the object is gradually corrected over time while maintaining the relative position of the object in the captured image. The correction to the upper distortion will be called "upper correction" hereinafter. Similarly, corrections on lower distortion, right distortion, and left distortion will be called lower correction, right correction, and left correction, respectively.

Figure 7:
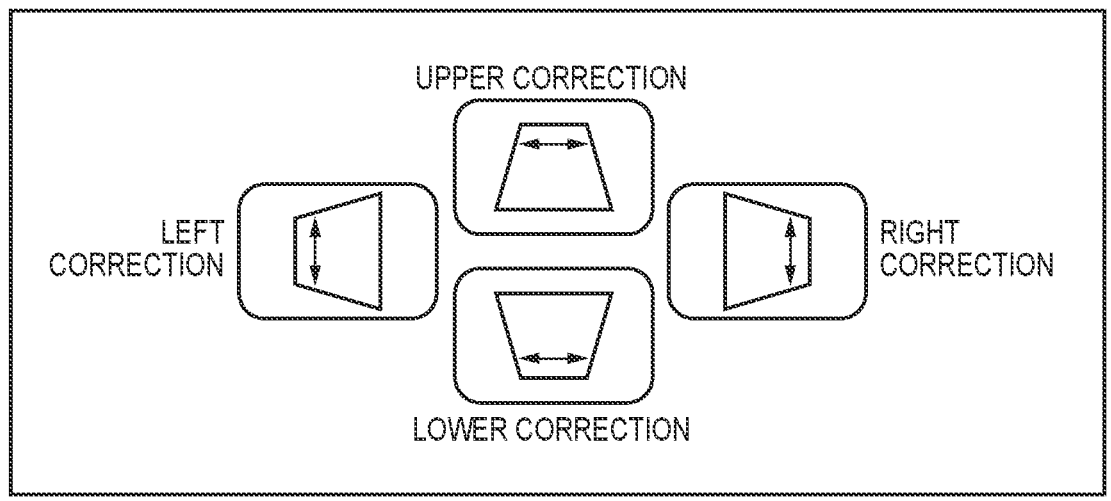
FIG. 7 is a view illustrating a distortion correction user interface.

FIG. 7 is a view illustrating a distortion correction user interface (UI). For example, the UI can be provided as a physical button or a GUI on the display unit in the monitoring apparatus 111. The user decides distortion correction (upper correction, lower correction, right correction, or left correction) to be executed in accordance with the distortion state of an object in a captured image displayed on the display unit of the monitoring apparatus 111, and presses a corresponding button on the UI. Then, user instructions (driving instruction, driving start instruction, and driving stop instruction) including information of a corresponding shift direction are transmitted.

For a captured image as shown in FIG. 6, "upper correction" is executed. Control of the camera unit 100 and image sensor 106 starts based on equation (3) at the start timing of pressing the button by the user, and stops at the end timing of pressing the button by the user.

While confirming the captured image changing over time, as shown in FIG. 6, the user presses the button and can perform distortion correction of the object at high precision. For example, when the user presses an "upper correction" button too long and the correction becomes excessive, he/she can press a "lower correction" button.

<Effects>

Calculation of the shift amount given by equation (3) does not require information such as the elevation angle of the image capturing apparatus and the object distance. More specifically, pieces of information necessary to calculate a shift amount based on equation (3) are the rotation amount of the camera unit 100, the vertical sensor size, and the imaging position. These pieces of information are information known for each image capturing apparatus or information obtained from control information. The above-described shift control is useful because it is not influenced by the detection precision of information such as the elevation angle and the object distance.

As described above with reference to FIG. 6, a change of the imaging range during correction control can be suppressed by synchronously performing rotation control of the camera unit 100 and shift control of the image sensor 106. That is, the object position with respect to the imaging range does not vary during correction control, only a distortion of the object is corrected, and thus the quality is high.

<Operation of Image Capturing Apparatus>

Synchronous control between rotation control of the camera unit 100 and shift control of the image sensor 106 will be further explained. In particular, two different synchronous control methods will be described.

<First Synchronous Control>

Figure 8:
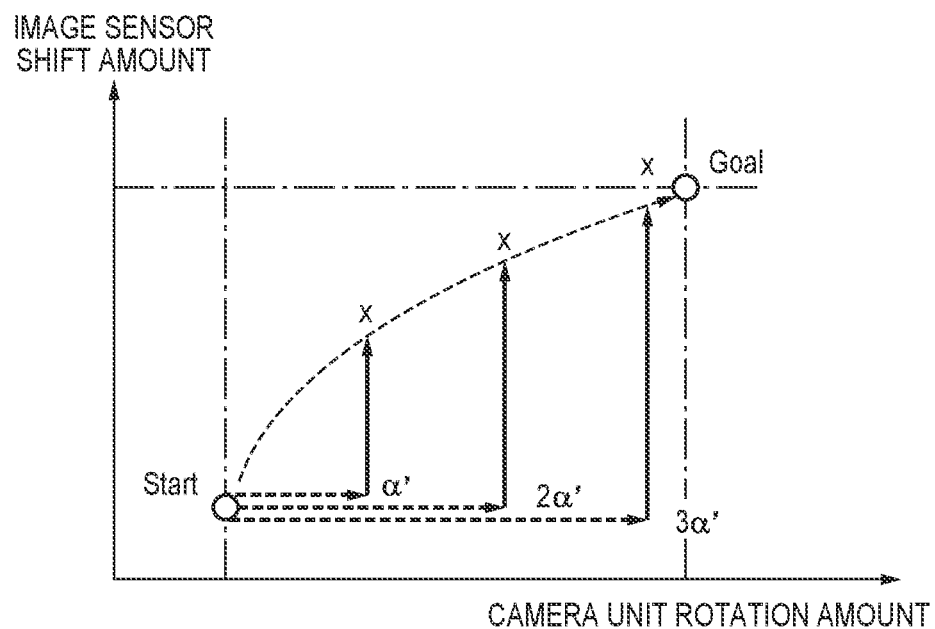
FIG. 8 is a graph for explaining a control method in the first synchronous control.

FIG. 8 is a graph for explaining a control method in the first synchronous control. In the first synchronous control, rotation control instructions each for one step (predetermined amount) of the camera unit 100 are sequentially accepted to sequentially decide the shift amount of the image sensor 106 and perform synchronous control. That is, the camera unit 100 and the image sensor 106 are synchronously driven while finely designating their target control positions.

FIG. 8 shows the relationship between the rotation amount of the camera unit 100 and the shift amount of the image sensor 106 under a given image capturing condition. In this case, the rotation amount of one step of the camera unit 100 is a', the shift amount x of the image sensor 106 in accordance with a rotation amount from a reference position is calculated, and control is performed based on the calculation result.

Figure 9:
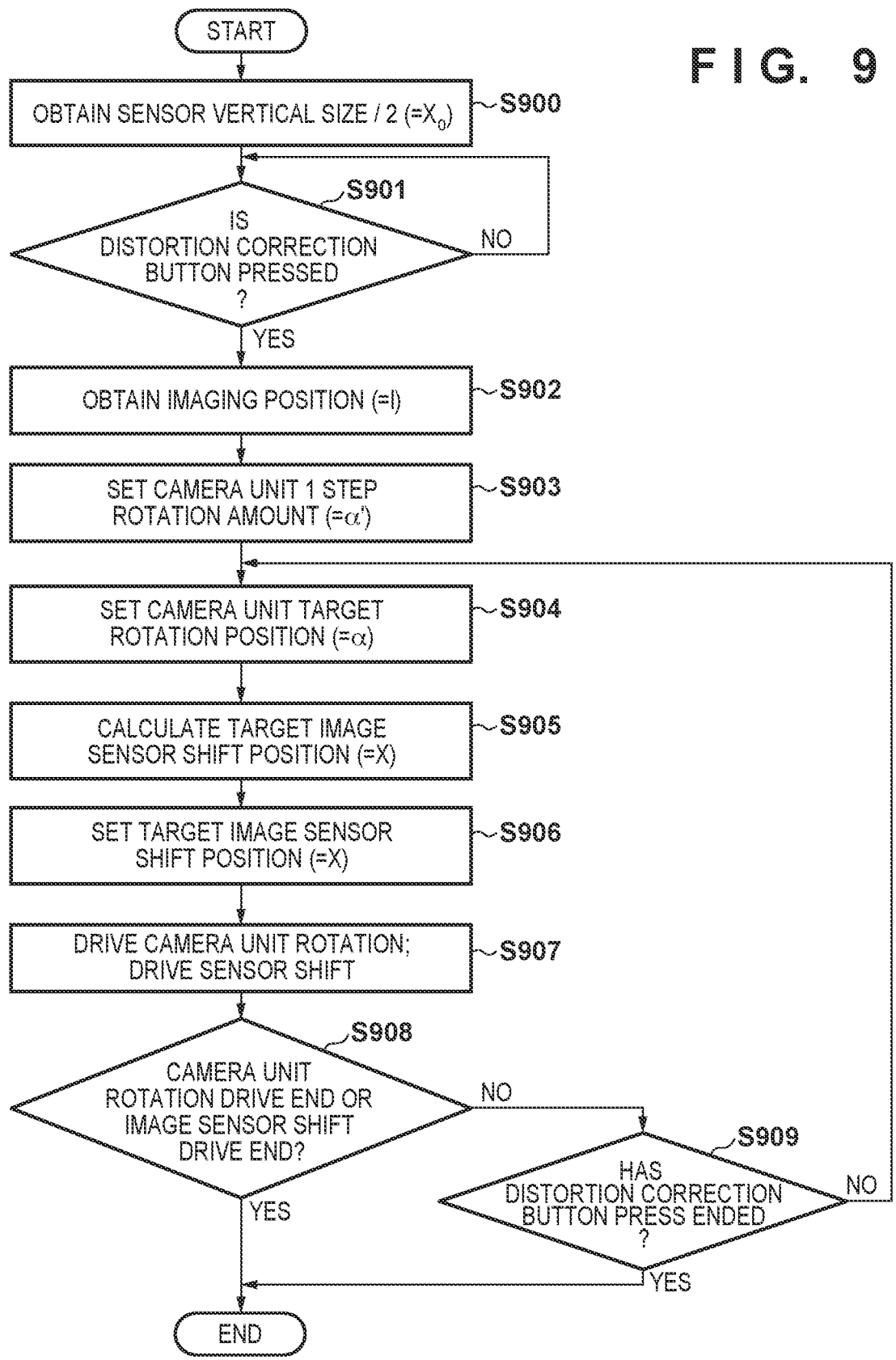
FIG. 9 is a flowchart of processing in the first synchronous control.

FIG. 9 is a flowchart of processing in the first synchronous control. A processing corresponding to the flowchart can be realized by, for example, executing the corresponding program (stored in the auxiliary storage device 213 or the like) by the CPU 211 operating in the imaging device. The respective units of the image capturing apparatus perform the following operation.

In step S900, the image capturing apparatus obtains $x_0$ (vertical sensor size/2) which is necessary to calculate the shift amount of the image sensor 106 based on equation (3).

In step S901, the image capturing apparatus determines whether a distortion correction button (FIG. 7) is pressed by a user operation. For example, the determination is made based on whether a control signal transmitted from the monitoring apparatus 111 and input via the communication unit 110 represents the press of the distortion correction button. If the distortion correction button is pressed, the process advances to step S902; if not, the determination continues.

Among four buttons shown in FIG. 7, a button corresponding to the shape of a distortion to be corrected is selectively pressed by a user operation. The driving directions (shift directions) of the camera unit 100 and image sensor 106 are uniquely decided based on the type of selected correction. For example, when upper correction is selected, rotation control is controlled to a tilt down direction, and shift control is controlled to a down direction. When lower correction is selected, rotation control and shift control are controlled to directions opposite to those in upper correction. Further, when left correction is selected, rotation control is controlled to a pan right direction, and shift control is controlled to a right direction. When right correction is selected, rotation control and shift control are controlled to directions opposite to those in left correction.

In step S902, the image capturing apparatus obtains the imaging position 1. The imaging position 1 is an imaging distance between O and B shown in FIG. 5, and represents an imaging distance between the optical system 202 and the imaging plane 203. The imaging position 1 can be obtained from a focus lens position used in control of the focus lens. It is enough to obtain the imaging position 1 only once between the time when the user presses the button and the time when the user stops pressing the distortion correction button.

In step S903, the driving amount decision unit 112 sets the rotation amount a' of one step of the camera unit 100. As the rotation amount a' of one step is smaller, the effect of maintaining the imaging range is higher. In step S904, the driving amount decision unit 112 sets the target rotation position a of the camera unit 100 in the rotation control unit 114. The target rotation position α is set based on the rotation amount a' of one step set in step S903. The target rotation position α of the camera unit 100 is an amount obtained by adding only the rotation amount a' of one step every rotation of one step using, as a reference, the rotation position of the camera unit 100 at the start of distortion correction.

In step S905, the driving amount decision unit 112 decides the target shift amount x of the image sensor 106 based on the target rotation position α of the camera unit 100 set in step S904. This decision is made based on equation (3), and the values obtained or set in steps S900, S902, and S904 are used as necessary $x_0$, I and α.

In step S906, the driving amount decision unit 112 sets, in the shift control unit 113, the target shift amount x of the image sensor 106 calculated in step S905.

In step S907, the rotation control unit 114 and the shift control unit 113 control the rotation driving unit 116 and the shift driving unit 115, respectively, and drive the camera unit 100 and the image sensor 106. That is, the camera unit 100 and the image sensor 106 are driven based on the target rotation position a of the camera unit 100 set in step S904 and the target shift amount x of the image sensor 106 set in step S906.

In step S908, the rotation control unit 114 and the shift control unit 113 respectively determine whether the control position of either of rotation driving of the camera unit 100 and shift driving of the image sensor 106 has reached a mechanical driving end. If it is determined that the control position of either driving has reached the driving end, the distortion correction control ends. If it is determined that the control position of neither driving has reached the driving end, the process advances to step S909.

In step S909, the image capturing apparatus determines whether the press of the distortion correction button has ended. Similar to step S901, the determination is made based on whether a control signal transmitted from the monitoring apparatus 111 and input via the communication unit 110 represents the press of the distortion correction button. If the press has ended, the distortion correction control ends; if not, the process returns to step S904 to continue the distortion correction control.

If the distortion correction button is kept pressed, the processes in steps S904 to S908 are repetitively performed and distortion correction can be performed while maintaining the relative position of the object with respect to the imaging range. The shift driving amount of the image sensor 106 is calculated in accordance with rotation control of one step of the camera unit 100. However, it is also possible to set the shift driving amount of one step of the image sensor 106 and calculate the rotation driving amount in accordance with the shift driving amount. Shift control may not target the image sensor 106, but the optical system 202 may be controlled.

As described above, in the first synchronous control, the camera unit 100 and the image sensor 106 can be synchronously driven while finely designating their target control positions.

<Second Synchronous Control>

Figure 10:
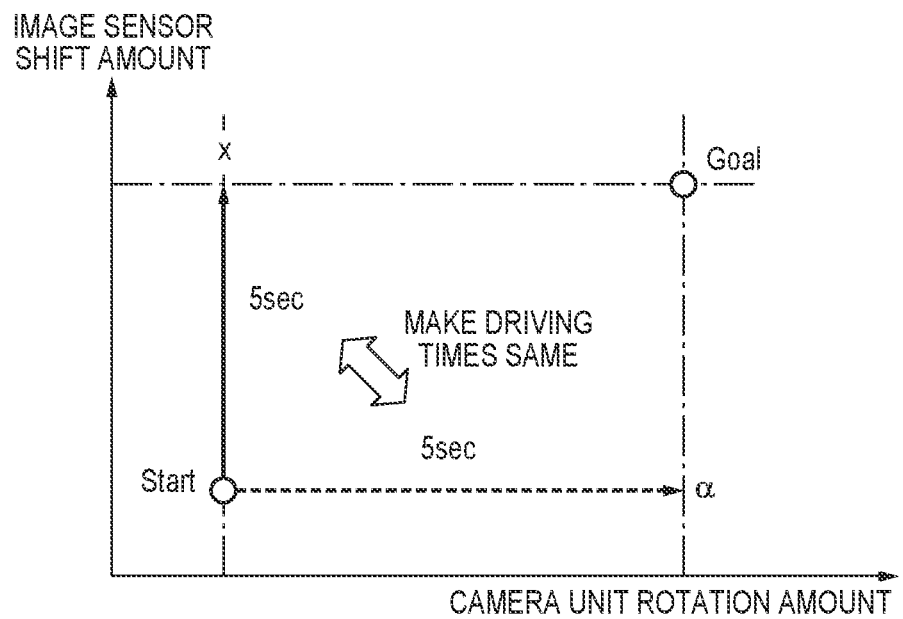
FIG. 10 is a graph for explaining a control method in the second synchronous control.

FIG. 10 is a graph for explaining a control method in the second synchronous control. In the second synchronous control, the camera unit 100 and the image sensor 106 are synchronously controlled by designating the driving speeds of rotation control of the camera unit 100 and shift control of the image sensor 106 at the start of control.

Figure 11A:
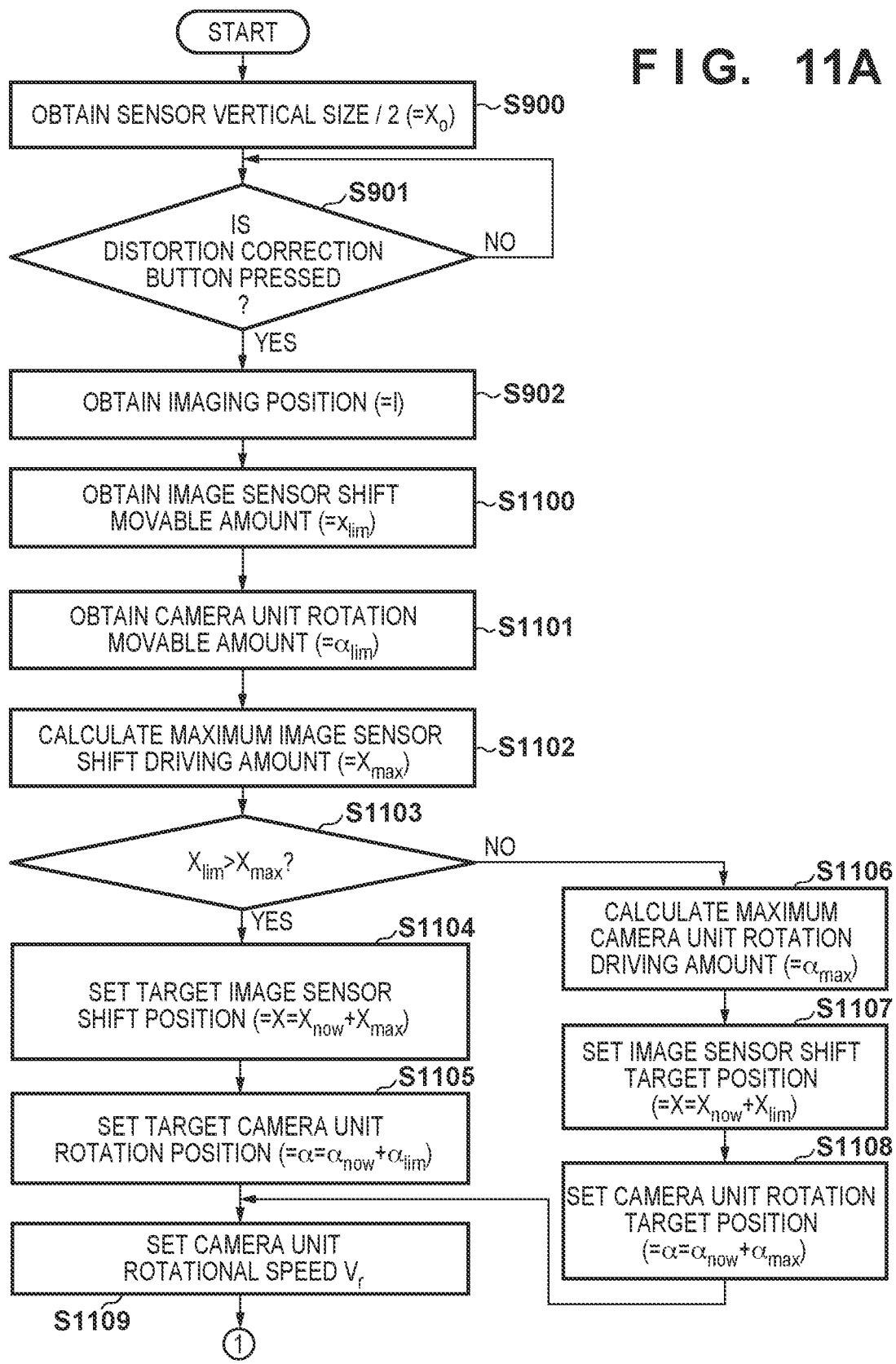
FIGS. 11A and 11B are a flowchart of processing in the second synchronous control.
Figure 11B:
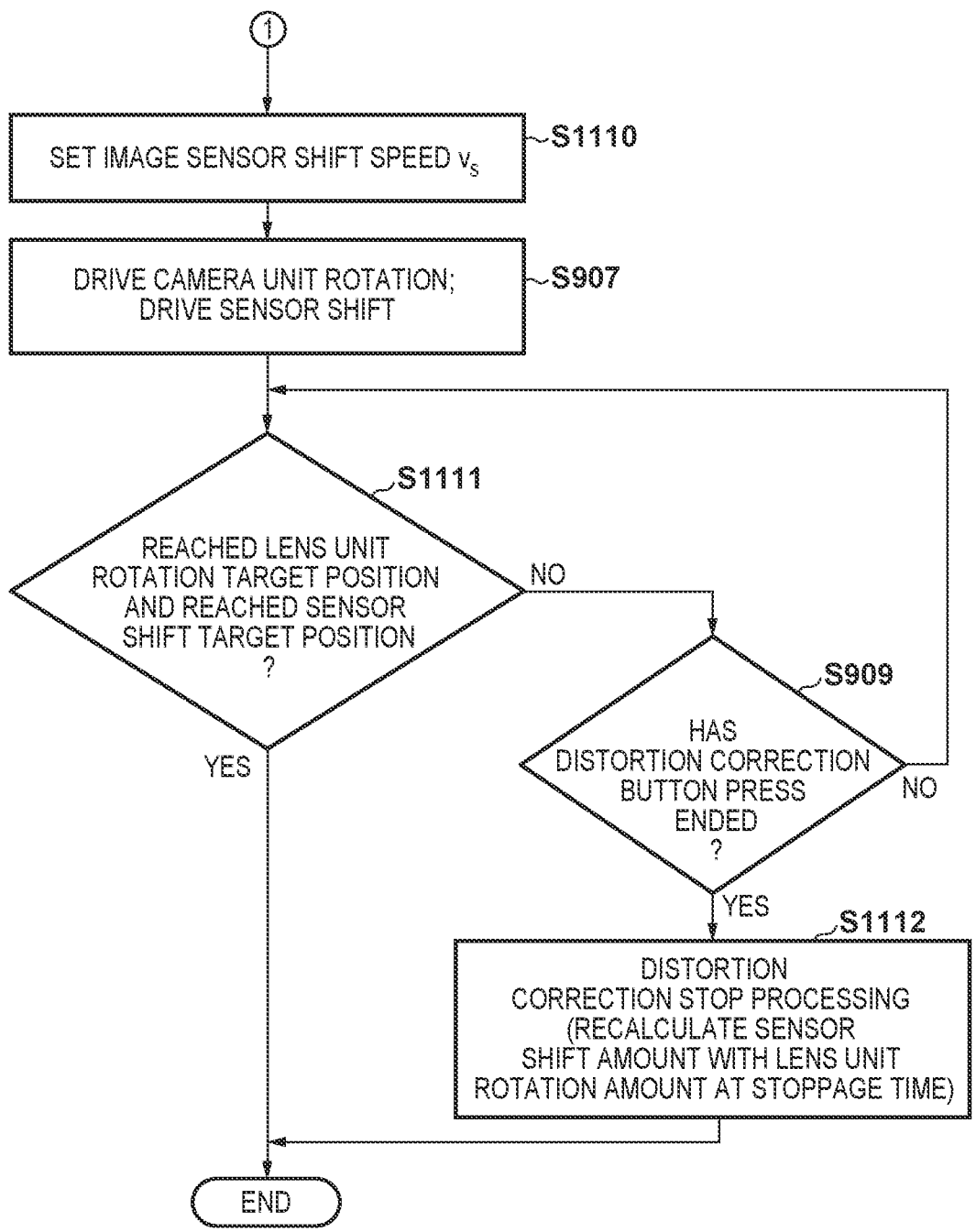

FIGS. 11A and 11B are a flowchart of processing in the second synchronous control. A processing corresponding to the flowchart can be realized by, for example, executing the corresponding program (stored in the auxiliary storage device 213 or the like) by the CPU 211 operating in the imaging device. The respective units of the image capturing apparatus perform the following operation. Note that processes in steps S900 to S902, S907, and S909 are similar to those in the first synchronous control, and a description thereof will not be repeated.

In step S1100, the image capturing apparatus obtains a shift movable amount $x_{lim}$ of the image sensor 106. The shift movable amount $x_{lim}$ is a distance from the current position of the image sensor 106 to the mechanical driving end.

In step S1101, the image capturing apparatus obtains a rotation movable amount $α_{lim}$ of the camera unit 100. The rotation movable amount lim is an angle from the current position of the camera unit 100 to the mechanical driving end.

In step S1102, the driving amount decision unit 112 calculates a maximum shift driving amount $x_{max}$ of the image sensor 106. The maximum shift driving amount $x_{max}$ is a shift driving amount of the image sensor 106 necessary to maintain the relative position of an object with respect to the imaging range when the camera unit 100 is driven to rotate only by the rotation movable amount $α_{lim}$ obtained in step S1101. The maximum shift driving amount $x_{max}$ is calculated based on equation (3).

In step S1103, the driving amount decision unit 112 compares the shift movable amount $x_{lim}$ calculated in step S1100 and the maximum shift driving amount $x_{max}$ calculated in step S1102. If $x_{lim} > x_{max}$, the process advances to step S1104. In the case of $x_{lim} > x_{max}$, when the camera unit 100 is controlled up to the mechanical driving end and shift control of the image sensor 106 necessary to maintain the relative position of the object is performed, the image sensor 106 does not collide against the mechanical driving end. If $x_{lim} \leq x_{max}$, the process advances to step S1106. In the case of $x_{lim} \leq x_{max}$, when the camera unit 100 is controlled up to the mechanical driving end, the image sensor 106 collides against the mechanical driving end and the relative position of the object cannot be maintained.

In step S1104, the driving amount decision unit 112 sets the target shift position of the image sensor 106 to a position obtained by adding only the maximum shift driving amount $x_{max}$ calculated in step S1102 to a current position $x_{now}$ of the image sensor 106.

In step S1105, the driving amount decision unit 112 sets the target rotation position of the camera unit 100 to a position obtained by adding only the rotation movable amount $\alpha_{lim}$ obtained in step S1101 to a current position $\alpha_{now}$ of the camera unit 100.

In step S1106, the driving amount decision unit 112 calculates a maximum rotation driving amount $\alpha_{max}$ of the camera unit 100. The maximum rotation driving amount $\alpha_{max}$ is a rotation driving amount of the camera unit 100 necessary to maintain the relative position of the object with respect to the imaging range when the image sensor 106 is controlled to shift only by the shift movable amount $x_{lim}$ obtained in step S1100. The maximum rotation driving amount $\alpha_{max}$ is calculated based on equation (3).

In step S1107, the driving amount decision unit 112 sets the target shift position of the image sensor 106 to a position obtained by adding only the shift movable amount $x_{lim}$ obtained in step S1100 to the current position $x_{now}$ of the image sensor 106.

In step S1108, the driving amount decision unit 112 sets the target rotation position of the camera unit 100 to a position obtained by adding only the maximum rotation driving amount max calculated in step S1106 to the current position $\alpha_{now}$ of the camera unit 100.

In step S1109, the driving amount decision unit 112 sets a rotational speed $v_r$ of the camera unit 100 in the rotation control unit 114. As the rotational control speed $v_r$ is lower, the user can more easily perform fine adjustment in designating the start and end of distortion correction.

In step S1110, the driving amount decision unit 112 sets a shift speed vs of the image sensor 106 in the shift control unit 113. At this time, the shift speed Vs is so set that the camera unit 100 and the image sensor 106 reach the target positions at the same time (that is, the driving times become equal).

In step S1111, the rotation control unit 114 and the shift control unit 113 respectively determine whether the camera unit 100 and the image sensor 106 have reached the target positions. If both the camera unit 100 and the image sensor 106 have reached the target positions, the distortion correction control ends. If at least either of the camera unit 100 and the image sensor 106 has not reached the target position, the process advances to step S909.

In step S1112, the image capturing apparatus performs distortion correction stop processing. In the stop processing, the control ends after the image sensor 106 is shifted to a shift position where the imaging range is maintained, with respect to the orientation of the camera unit 100 at a timing when a distortion correction end instruction is accepted.

When the linearity between the rotation amount of the camera unit 100 and the shift amount of the image sensor 106 is low, the relative position of the object with respect to the imaging range may not be completely maintained at a point before the camera unit 100 and the image sensor 106 reach the target positions. Thus, when distortion correction is ended by a user operation before the target control positions, the imaging range is adjusted by the stop processing in step S1112.

As described above, in the second synchronous control, the camera unit 100 and the image sensor 106 can be synchronously driven by designating the driving speeds of control of the camera unit 100 and image sensor 106 at the start of control.

In both the above-described first synchronous control and second synchronous control, the camera unit 100 and the image sensor 106 can be synchronized. However, the first synchronous control is superior to the second synchronous control because the maintenance effect of the relative position of an object during distortion correction control is high. To the contrary, the second synchronous control is superior to the first synchronous control in shooting conditions requiring high-speed control because the number of calculations and the number of driving operations are small (one).

<Hardware Arrangement of Image Capturing Apparatus>

Figure 20:
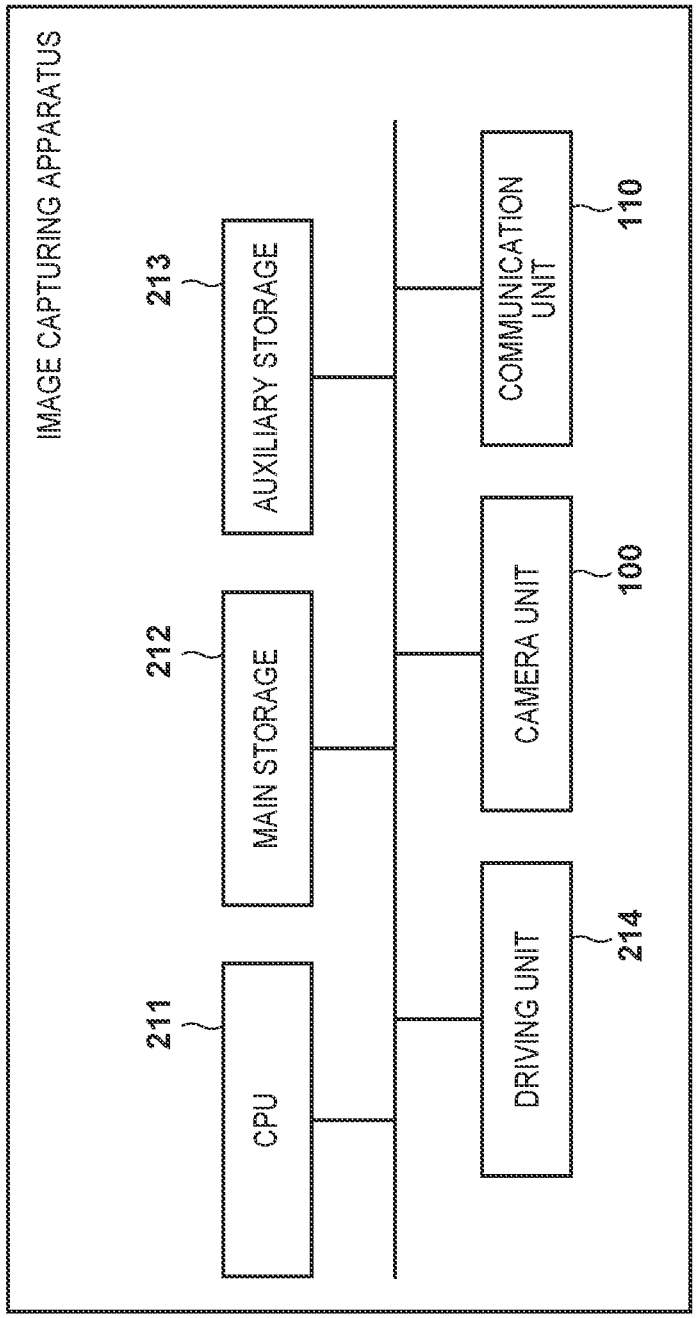
FIG. 20 is a block diagram for explaining the hardware arrangement of the image capturing apparatus.

Next, an example of the hardware arrangement of the image capturing apparatus will be described with reference to the block diagram of FIG. 20. Note that the arrangement shown in FIG. 20 is merely an example of an arrangement applicable to the image capturing apparatus, and the arrangement of the image capturing apparatus can be properly modified/changed.

A CPU 211 executes processing using a computer program and data stored in a main storage 212. The CPU 211 controls the operation of the overall image capturing apparatus, and executes or controls each process that is performed by the image capturing apparatus in the above description. For example, the CPU 211 executes processing using a computer program and data stored in the main storage 212, implementing the functions of the respective functional units of the camera signal processor 109, driving amount decision unit 112, shift control unit 113, and rotation control unit 114 shown in FIG. 1.

The main storage 212 is a storage such as a Random Access Memory (RAM). The main storage 212 has areas for storing computer programs and data loaded from an auxiliary storage device 213, images captured by the camera unit 100, and various data received from the monitoring apparatus 111 via the communication unit 110. Further, the main storage 212 has a work area used when the CPU 211 executes various processes. In this manner, the main storage 212 can properly provide various areas.

The auxiliary storage device 213 is a large-capacity storage such as a Hard Disk Drive (HDD), a Read Only Memory (ROM), or a Solid State Drive (SSD). The auxiliary storage device 213 saves an Operating System (OS), and computer programs and data for causing the CPU 211 to execute or control each process that is performed by the image capturing apparatus in the above description. The auxiliary storage device 213 also saves data received from the monitoring apparatus 111 via the communication unit 110. The computer programs and data saved in the auxiliary storage device 213 are properly loaded to the main storage 212 under the control of the CPU 211, and processed by the CPU 211.

A driving unit 214 drives the camera unit 100 based on image capturing parameters received from the monitoring apparatus 111. For example, the driving unit 214 corresponds to the shift driving unit 115 that performs shift control of the image sensor 106, and the rotation driving unit 116 that performs rotation control of the camera unit 100. Note that the control target by the driving unit 214 is not limited to a specific target, and may be another target (for example, the position of the camera unit 100).

The camera unit 100 includes the image sensor and the optical system, and forms an image of an object on the image sensor using, as the center of image capturing, the intersection between the optical axis of the optical system and the image sensor. The image sensor is, for example, a Complementary Metal-Oxide Semiconductor (CMOS) or a Charged Coupled Device (CCD). The communication unit 110 performs data communication with the monitoring apparatus 111.

As described above, according to the first embodiment, when performing shift control of the image sensor, rotation control (tilt or pan) of the camera unit is performed in synchronization with shift control of the image sensor. More specifically, rotation control is synchronously performed to compensate for a change of the imaging range caused by shift control. By this synchronous control, a change of the imaging range during correction control can be suppressed, and a high-quality image can be provided.

(Modification)

In a modification, an example will be explained in which the image capturing apparatus determines the shape of a distortion generated in an object based on a captured image and performs rotation control of the camera unit 100 and shift control of the image sensor 106 so as to correct the distortion shape.

Figure 12:
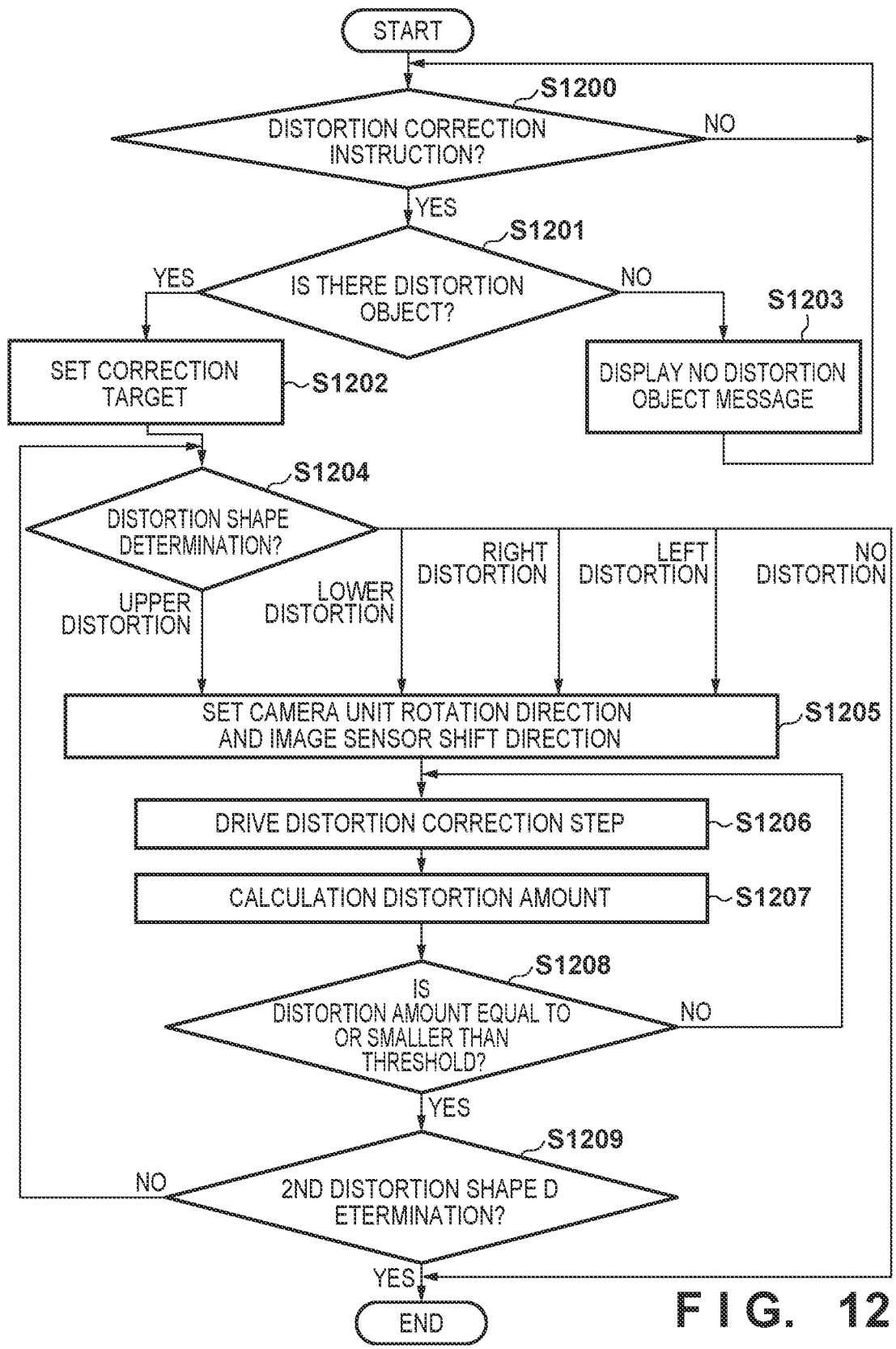
FIG. 12 is a flowchart of processing executed by an image capturing apparatus according to a modification.

FIG. 12 is a flowchart of processing executed by the image capturing apparatus according to the modification. A processing corresponding to the flowchart can be realized by, for example, executing the corresponding program (stored in the auxiliary storage device 213 or the like) by the CPU 211 operating in the imaging device.

In step S1200, the image capturing apparatus determines whether a distortion correction execution instruction from the user has been received. If the image capturing apparatus determines that the distortion correction instruction from the user has been received, the process advances to step S1201. If the image capturing apparatus determines that no instruction has been received, it keeps waiting for a distortion correction instruction.

In step S1201, the image capturing apparatus determines whether an object suffering a distortion (to be referred to as a distorted object hereinafter) exists in a captured image. If the image capturing apparatus determines that a distorted object exists, the process advances to step S1202. If the image capturing apparatus determines that no distorted object exists, the process advances to step S1203. As a distorted object presence/absence determination method, a method based on depth information and a method based on edge detection will be explained. However, the presence/absence of a distorted object may be determined by another method.

Figure 13:
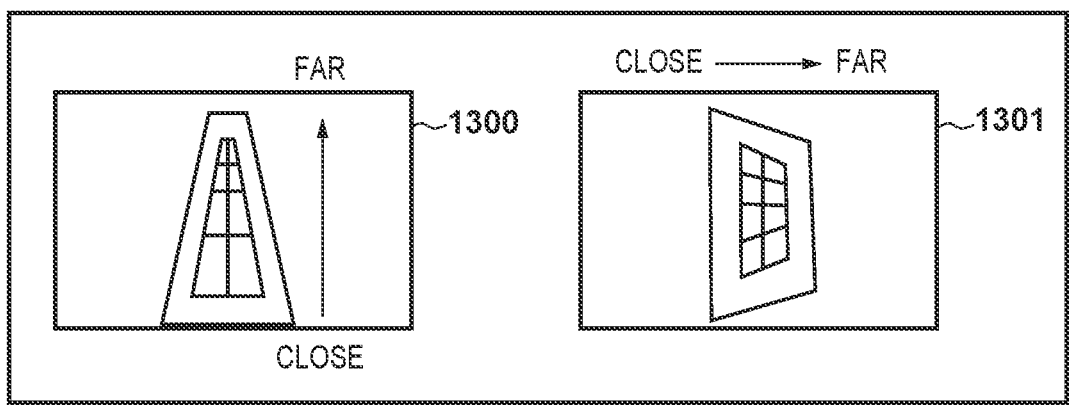
FIG. 13 is a view for explaining distortion shape determination based on depth information.

FIG. 13 is a view for explaining distortion shape determination based on depth information. In the distorted object presence/absence determination method based on depth information (for example, a depth image in which each pixel has a depth value at its position), when the object distance monotonously changes in a given object region, it is determined that the object does not directly face the image capturing apparatus and is a distorted object.

Figure 14:
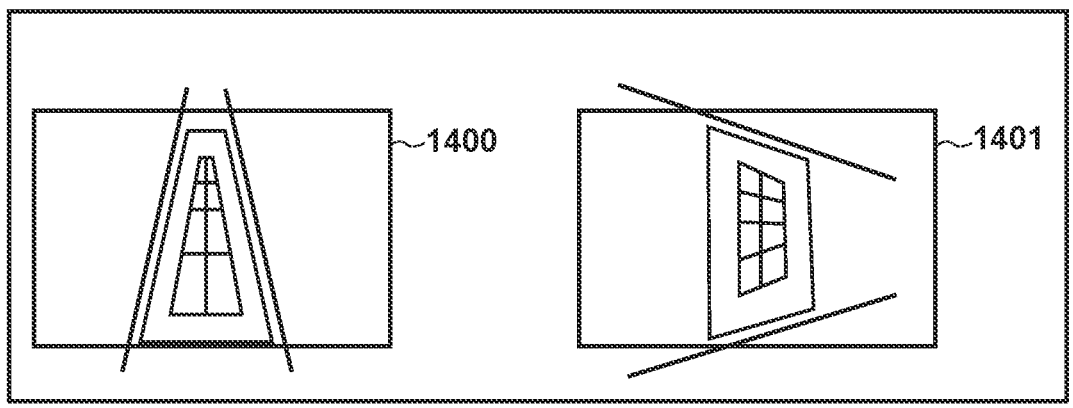
FIG. 14 is a view for explaining distortion shape determination based on edge detection.

FIG. 14 is a view for explaining distortion shape determination based on edge detection. In the distorted object presence/absence determination method based on edge detection, when the edge interval in the vertical direction (or horizontal direction) is not constant in regard to a pair of edges detected in a given object region, it is determined that the object is a distorted object.

In step S1202, the image capturing apparatus sets, as a distortion correction target, an object determined as a distorted object in step S1201. In some scenes, a plurality of distorted objects may exist in a captured image. In this case, a correction target object is set by accepting selection of the correction target object from the user.

Figure 15:
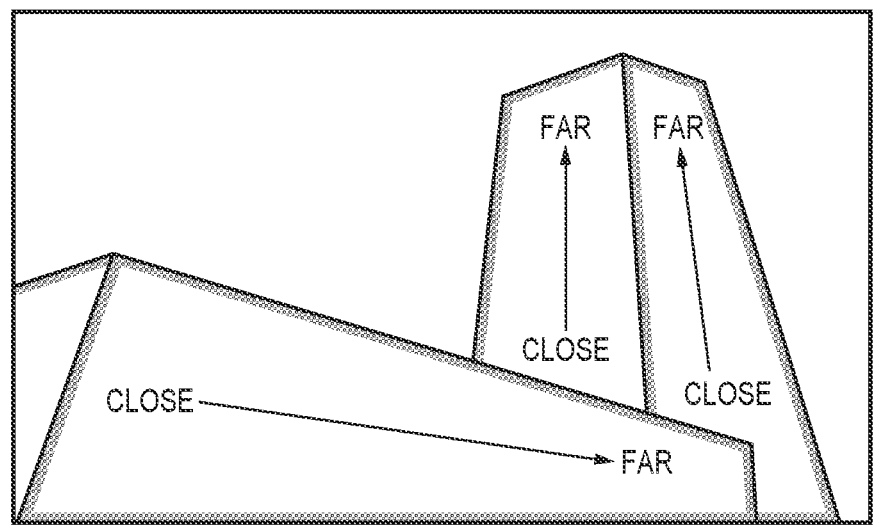
FIG. 15 is a view for explaining distortion shape determination when a plurality of objects exist.
Figure 16:
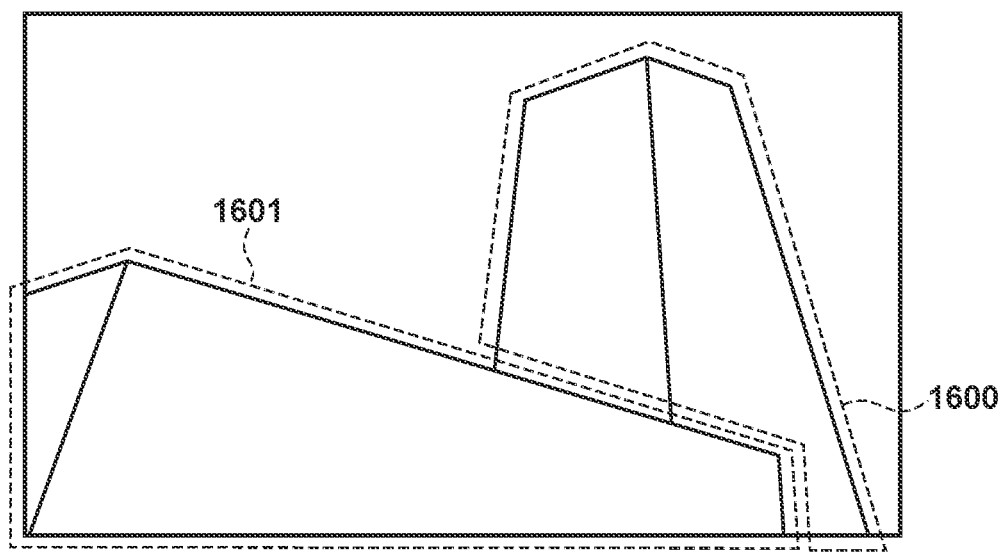
FIG. 16 is a view for explaining correction target decision when a plurality of objects exist.

FIG. 15 is a view for explaining distortion shape determination when a plurality of objects exist. FIG. 16 is a view for explaining correction target decision when a plurality of objects exist. More specifically, FIG. 16 shows a screen on which selection of a correction target object is accepted from the user. FIG. 16 shows a display screen of a form in which a plurality of polygonal regions (e.g., 1600 and 1601) obtained by dividing a region for respective objects determined as distorted objects in step S1201 are superposed and displayed on a captured image, and selection of one polygonal region is accepted from the user.

In step S1203, the image capturing apparatus notifies the user that no distorted object (correction target object) exists in the captured image.

In step S1204, the image capturing apparatus determines the distortion shape type (upper distortion, lower distortion, right distortion, or left distortion) of the correction target object. For the distortion shape determination, depth information-based determination and edge detection-based determination are possible.

For example, in depth information corresponding to a captured image 1300 in FIG. 13, the depth (object distance) to the building region in the captured image 1300 changes from the near side to the far side in a direction from the lower end to upper end of the image. Because of perspective, an object looks large as the distance is short and small as it is long. From this, it can be determined that the distortion shape of the building of the captured image 1300 is "upper distortion" (the lower portion of the image is large and the upper portion is small).

Similarly, in depth information corresponding to a captured image 1301, the depth (object distance) to the building region in the captured image 1301 changes from the near side to the far side in a direction from the left end to right end of the image. It can be determined that the distortion shape of the building of the captured image 1301 is "right distortion" (the left portion of the image is large and the right portion is small). In this manner, depth information can be used to determine a distortion shape based on a direction in which the depth in the object (building) within the captured image changes.

In a captured image 1400 of FIG. 14, the interval between a pair of edges decreases in a direction from the lower end to upper end of the image in regard to the pair of edges detected for the object in the captured image. In this case, it can be determined that the distortion shape of the object is "upper distortion". Further, in a captured image 1401, the interval between a pair of edges decreases in a direction from the left end to right end of the image in regard to the pair of edges detected for the object in the captured image. In this case, it can be determined that the distortion shape of the object is "right distortion". In this fashion, the distortion shape of the object can be determined based on a direction in which the edge interval between a pair of edges detected for the object changes.

In step S1205, based on the distortion shape determined in step S1204, the image capturing apparatus sets the driving directions of rotation control of the camera unit 100 and shift control of the image sensor 106 suited to each distortion shape.

FIG. 17 is a table showing the relationship between rotation control and shift control for each distortion shape. As shown in FIG. 17, the driving directions of the camera unit 100 and image sensor 106 for correcting each distortion shape can be uniquely decided for each distortion shape.

In step S1206, the image capturing apparatus performs distortion correction driving. Assume that distortion correction driving (step driving) is performed by every predetermined amount and steps S1206 to S1208 are repeated. Note that this processing is similar to the processing (steps S902 to S907) described with reference to FIG. 9, and a description thereof will not be repeated.

In step S1207, the image capturing apparatus calculates a current distortion amount generated in the correction target object. Even for the distortion amount calculation, depth information-based calculation and edge detection-based calculation are possible.

Figure 18:
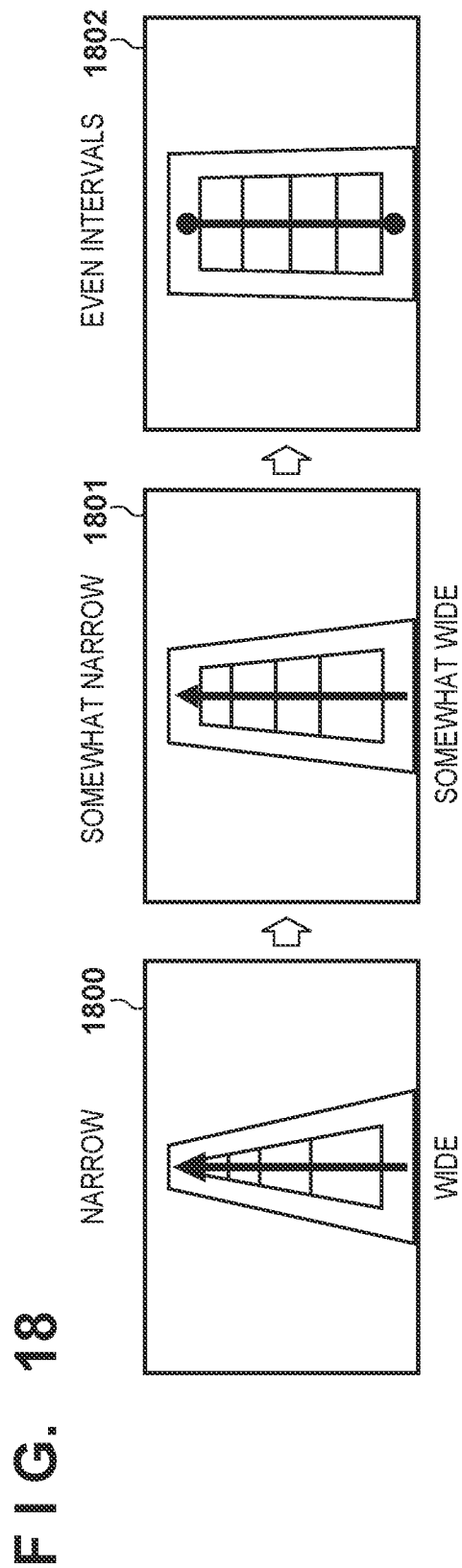
FIG. 18 is a view for explaining distortion amount calculation based on depth information.

FIG. 18 is a view for explaining distortion amount calculation based on depth information. FIG. 18 exemplifies a change of the captured image during distortion correction driving in step S1206. A captured image 1800 represents that the difference in depth (object distance) between the upper and lower portions of the correction target object is large. In this case, the distortion amount is calculated to be a large value. In a captured image 1801 obtained after performing distortion correction driving of one or more steps, the difference in depth between the upper and lower portions of the correction target object becomes smaller than that in the captured image 1800. Hence, the distortion amount is calculated to be a smaller value than for the captured image 1800. In a captured image 1802 obtained after further performing distortion correction driving, the depths at the upper and lower portions of the correction target object are substantially equal. The distortion amount is therefore calculated to be a value close to 0. When the distortion amount is calculated based on depth information, the difference in depth between a plurality of regions (for example, upper and lower portions) in a correction target object can be evaluated as a distortion amount.

Figure 19:
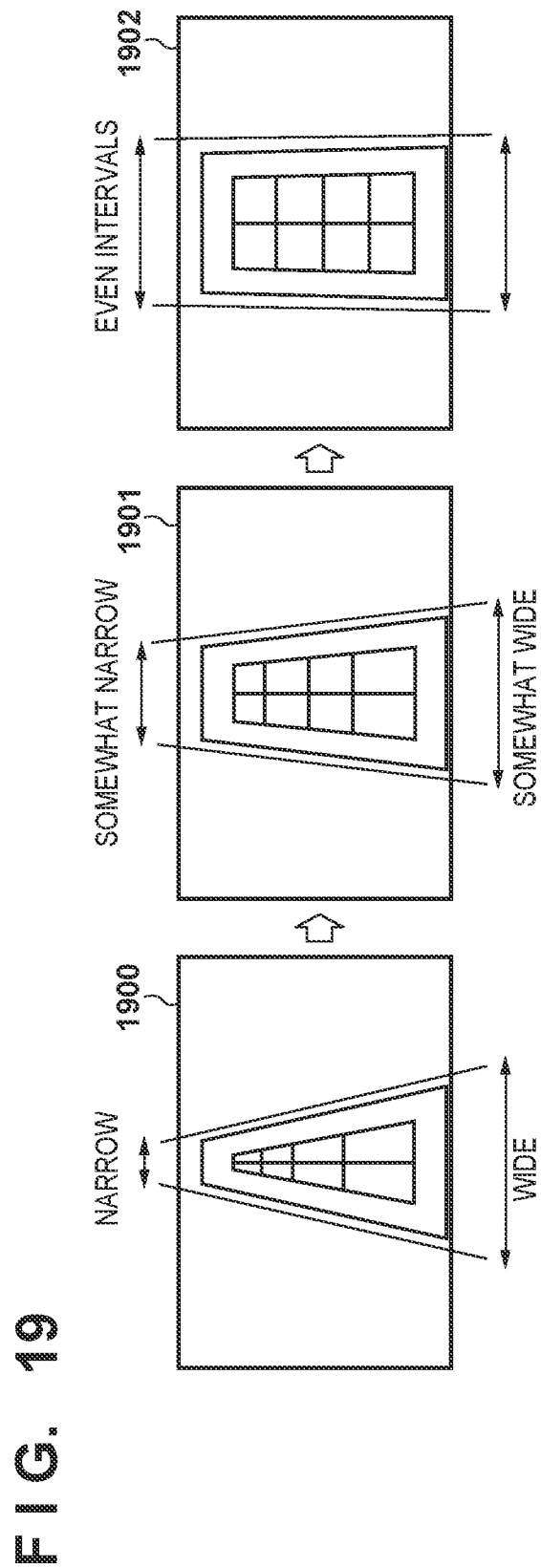
FIG. 19 is a view for explaining distortion amount calculation based on edge detection.

FIG. 19 is a view for explaining distortion amount calculation based on edge detection. FIG. 19 exemplifies a change of the captured image during distortion correction driving in step S1206. A captured image 1900 represents that the difference in edge interval between a pair of edges is large between the upper and lower portions of the correction target object. In this case, the distortion amount is calculated to be a large value. In a captured image 1901 obtained after performing distortion correction driving of one or more steps, the difference in edge interval between the upper and lower portions of the correction target object becomes smaller than that in the captured image 1900. The distortion amount is calculated to be a smaller value than for the captured image 1900. In a captured image 1902 obtained after further performing distortion correction driving, the edge intervals at the upper and lower portions of the correction target object is substantially equal. The distortion amount is therefore calculated to be a value close to 0. When the distortion amount is calculated based on edge detection, the difference in edge interval between a plurality of regions (for example, upper and lower portions) in a correction target object can be evaluated as a distortion amount.

In step S1208, the image capturing apparatus determines whether the distortion amount calculated in step S1207 is equal to or smaller than a predetermined threshold. If the distortion amount is larger than the predetermined threshold, the distortion correction is not enough and the process returns to step S1206. If the distortion amount is equal to or smaller than the predetermined threshold, the process advances to step S1209.

In step S1209, the image capturing apparatus determines whether the distortion shape determination (step S1204) has been performed twice. This is because both a vertical distortion (upper or lower distortion) and horizontal distortion (right or left distortion) of the captured image sometimes exist. Since only either vertical distortion or horizontal distortion is corrected by the correction (steps S1204 to S1208) based on one distortion shape determination, it is determined whether the distortion shape determination has been performed twice.

As described above, the image capturing apparatus can correct a distortion generated in an object of a captured image based on depth information corresponding to the captured image or the result of edge detection to the captured image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-039559, filed Mar. 14, 2022, and Japanese Patent Application No. 2022-184973, filed Nov. 18, 2022, which are hereby incorporated by reference herein in their entirety.

What is claimed is:

1. An image capturing apparatus comprising:
an image capturing unit including an imaging optical system and an image sensor;
a rotation driving unit configured to drive the image capturing unit in a pan direction and/or tilt direction;

a shift driving unit configured to drive at least one of the imaging optical system and the image sensor within a plane parallel to an imaging plane;

a processor; and a memory containing instructions that, when executed by the processor, cause the processor to function as:

a synchronous control unit configured to synchronize a rotation driving of the image capturing unit and a shift driving of at least one of the imaging optical system and the image sensor so as not to change an imaging range of the image capturing unit during performing a correction on distortion of an object in a captured image captured by the image capturing unit.

2. The apparatus according to claim 1, wherein the shift driving unit drives at least one of the imaging optical system and the image sensor within the plane parallel to the imaging plane to correct for a distortion of the object in the captured image captured by the image capturing unit.

3. The apparatus according to claim 2, wherein the synchronous control unit decides a second driving amount in one of the rotation driving and the shift driving based on a first driving amount in the other.

4. The apparatus according to claim 3, wherein the synchronous control unit decides the second driving amount further based on a size of the image sensor and an imaging distance from the imaging optical system to the image sensor.

5. The apparatus according to claim 4, wherein the instructions further cause the processor to function as an acquiring unit configured to acquire a user instruction to the correction on distortion of an object in the captured image.

6. The apparatus according to claim 5, wherein the acquiring unit is configured to sequentially acquire a driving instruction to drive at least one of the imaging optical system and the image sensor by a predetermined amount, and if the acquiring unit acquires the driving instruction, the synchronous control unit drives t at least one of the imaging optical system and the image sensor by the predetermined amount based on the driving instruction, sequentially decides a driving amount of the image capturing unit corresponding to driving of the predetermined amount, and drives the image capturing unit.

7. The apparatus according to claim 5, wherein the acquiring unit is configured to acquire a driving instruction to drive at least one of the imaging optical system and the image sensor, and if the acquiring unit acquires the driving instruction, the synchronous control unit decides driving speeds of both the rotation driving unit and the shift driving unit, and starts driving.

8. The apparatus according to claim 7, wherein if the acquiring unit acquires the driving instruction, the synchronous control unit decides the driving speeds to equalize driving times of both the rotation driving unit and the shift driving unit.

9. The apparatus according to claim 8, wherein the acquiring unit is configured to further acquire a driving stop instruction to stop driving of at least one of the imaging optical system and the image sensor, and if the acquiring unit acquires the driving stop instruction while the rotation driving unit and the shift driving unit are driven, the synchronous control unit adjusts the other based on one of an orientation of the image capturing unit and a shift position of the image sensor at a timing when the driving stop instruction is acquired.

10. The apparatus according to claim 9, wherein the driving instruction includes information of a shift direction of the image sensor by the shift driving unit.

11. The apparatus according to claim 1, wherein the instructions further cause the processor to function as an acquiring unit configured to acquire a driving start instruction to repetitively drive the shift driving unit by every predetermined amount, wherein if the acquiring unit acquires the driving start instruction, the shift driving unit starts driving.

12. The apparatus according to claim 11, wherein the instructions further cause the processor to function as:

a depth obtaining unit configured to obtain depth information corresponding to the captured image obtained by the image capturing unit; and a decision unit configured to decide a distortion amount of the object in the captured image obtained by the image capturing unit, wherein the decision unit decides the distortion amount based on a difference in a depth in an object region included in the captured image.

13. The apparatus according to claim 11, wherein the instructions further cause the processor to function as:

an edge detection unit configured to detect an edge of the object included in the captured image obtained by the image capturing unit; and a decision unit configured to decide a distortion amount of the object in the captured image obtained by the image capturing unit, wherein the decision unit decides the distortion amount based on a difference in an edge interval between a pair of edges detected for the object by the edge detection unit.

14. The apparatus according to claim 1, wherein the instructions further cause the processor to function as a decision unit configured to decide a distortion shape type of the object in the captured image obtained by the image capturing unit, wherein driving directions of the rotation driving unit and the shift driving unit are decided based on the distortion shape type decided by the decision unit.

15. The apparatus according to claim 14, wherein the instructions further cause the processor to function as a depth obtaining unit for obtaining depth information corresponding to the captured image obtained by the image capturing unit, wherein the decision unit decides the distortion shape type based on a change direction of a depth in an object region included in the captured image.

16. The apparatus according to claim 14, wherein the instructions further cause the processor to function as an edge detection unit configured to detect an edge of the object included in the captured image obtained by the image capturing unit, wherein the decision unit decides the distortion shape type based on a change direction of an edge interval between a pair of edges detected for the object by the edge detection unit.

17. The apparatus according to claim 14, wherein the instructions further cause the processor to function as an acquiring unit configured to acquire, if a plurality of objects suffering a distortion exist in the captured image, selection of one object subjected to decision by the decision unit.

18. The apparatus according to claim 1, wherein the instructions further cause the processor to function as a decision unit configured to sequentially decide a distortion amount of an object in a captured image obtained by the image capturing unit,
  wherein if the distortion amount decided by the decision unit becomes not larger than a predetermined threshold, the synchronous control unit stops driving.

19. A method of controlling an image capturing apparatus, the image capturing apparatus includes:
  an image capturing unit including an imaging optical system and an image sensor;
  a rotation driving unit configured to drive the image capturing unit in a pan direction and/or tilt direction; and
  a shift driving unit configured to drive at least one of the imaging optical system and the image sensor within a plane parallel to an imaging plane, and
  the control method comprises:
  synchronizing a rotation driving of the image capturing unit and a shift driving of at least one of the imaging optical system and the image sensor so as not to change an imaging range of the image capturing unit during performing a correction on distortion of an object in a captured image captured by the image capturing unit.

20. A non-transitory computer-readable recording medium storing a program causing a computer to execute a method of controlling an image capturing apparatus, the image capturing apparatus includes:
  an image capturing unit including an imaging optical system and an image sensor;
  a rotation driving unit configured to drive the image capturing unit in a pan direction and/or tilt direction; and
  a shift driving unit configured to drive at least one of the imaging optical system and the image sensor within a plane parallel to an imaging plane, and
  the control method includes:
  synchronizing a rotation driving of the image capturing unit and a shift driving of at least one of the imaging optical system and the image sensor so as not to change an imaging range of the image capturing unit during performing a correction on distortion of an object in a captured image captured by the image capturing unit.

* * * * *